Dec. 14, 1971 C. J. TRIBLE 3,626,577

METHOD OF RECLAIMING SCRAP FERROUS METAL SHEET WITHOUT MELTING

Original Filed Aug. 25, 1969 2 Sheets-Sheet 1

INVENTOR.
Clayton J. Trible
BY
George A. Grove
ATTORNEY

Dec. 14, 1971     C. J. TRIBLE     3,626,577

METHOD OF RECLAIMING SCRAP FERROUS METAL SHEET WITHOUT MELTING

Original Filed Aug. 25, 1969     2 Sheets-Sheet 2

INVENTOR.
Clayton J. Trible
BY
George A. Grove
ATTORNEY

United States Patent Office 3,626,577
Patented Dec. 14, 1971

3,626,577
METHOD OF RECLAIMING SCRAP FERROUS METAL SHEET WITHOUT MELTING
Clayton J. Trible, Troy, Mich., assignor to General Motors Corporation, Detroit, Mich.
Continuation of application Ser. No. 852,711, Aug. 25, 1969, which is a continuation-in-part of application Ser. No. 737,775, June 17, 1968. This application Feb. 24, 1970, Ser. No. 13,368
Int. Cl. B23q 17/00
U.S. Cl. 29—403
14 Claims

ABSTRACT OF THE DISCLOSURE

A method is disclosed for converting ferrous metal scrap, originating from sheet or strip metal, into reusable flat-rolled ferrous metal products. For example, many pieces of carbon steel offal, randomly sized and shaped but generally less than three inches in greatest dimension, are deposited on a long carrier sheet of substantially the same composition to a suitable height. The carrier sheet and offal are heated in a reducing atmosphere to about 2000° F. and then rolled into a strip or sheet of reusable flat-rolled steel stock.

---

This application is a continuation application of my copending application Ser. No. 852,711, filed Aug. 25, 1969, which in turn is a continuation-in-part of my copending application Ser. No. 737,775, filed June 17, 1968.

This invention relates to the use of those ferrous metal flat-rolled products which are commonly classified as hot-rolled, or hot-rolled and cold-reduced, sheet and strip. More particularly, this invention relates to a method of converting randomly sized and shaped carbon steel sheet scrap (offal), whether produced by conventional forming operations or by other operations, into reusable flat-rolled stock without melting.

Carbon steel sheet and strip, the precise technical nomenclature usually depending upon the widths and thickness of the product, are employed in very large quantities in the production of thousands of useful articles of commerce. For convenience such flat-rolled steel starting materials will sometimes hereinafter be referred to simply as carbon steel sheet. In connection with the production of articles from steel sheet a substantial amount of scrap or offal is usually generated. FIG. 1 is a line and block flow diagram which very briefly summarizes conventional practice in the formation, use and disposal of, for example, carbon steel sheet. Depending upon the nature of the forming operation the sheet offal may be present in virtually any size and shape. In a typical case SAE 1008 steel sheet is employed in conventional forming operations such as stamping, drawing or cold forming. Of the millions of tons of such material which is used in the United States each year, up to about one-third of the starting material may be trimmed away as scrap or offal by the forming dies. As shown in FIG. 1, in modern practice, prior to the subject invention, this scrap material is returned to the steel manufacturer where it is combined with other scrap and pig iron and remelted. The melt is subjected to conventional steel making operations and ultimately cast into an ingot mold. The ingot is subjected to a series of rolling operations well known in the art of forming flat-rolled steel products whereby a steel sheet is produced for commercial use.

It must be recognized that the remelting of scrap steel requires substantial amounts of energy. Not only must the material be heated to its melting point, but additional energy for melting and superheating the steel must be provided. Such melting operations frequently contribute to air pollution. The cast ingots must be stripped from the molds, reheated (soaked) and rolled into slabs. After reduction to a prescribed width and thickness, the slabs are inspected and scrap portions sheared away. The slabs are then ready to be sent to the hot strip mill wherein substantial mill scale losses are encountered. It is noted that much of this effort and energy is being expended on material that was already acceptable in chemical analysis for reuse although it may have been of irregular size and shape. While some scrap is advantageously employed in steel making operations or in cast iron manufacture, the processing of all of the millions of tons of carbon steel sheet scrap in the above manner seems to be wasteful of time and material resources.

It is to be noted that in earlier days of iron manufacture, prior to the invention of efficient melting furnaces and steel making processes, some scrap iron recovery techniques were known which did not involve melting. For example, in Roll Design and Mill Layout, Ross E. Beynon, AISE, 1956, the work of Henry Cort in England in the latter part of the eighteenth century is described. Cort is credited with accomulating iron scrap into piles or bundles and heating and hammering the bundles into blooms which could be passed through rolling mills of his design. This work was conducted on relatively small amounts of scrap mast hoops, plates, bars, bolts and the like and his process involved repeated heating followed by repeated hammering and/or rolling in an uncomtrolled environment which is by no means suitable for mass production of random sheet scrap into a high quality commercial product.

Accordingly, it is an object of my invention to provide a method of reconstituting randomly sized and shaped ferrous metal sheet offal and other scrap, particularly on a mass production basis, to produce a flat-rolled ferrous metal product of commercial utility.

It is another object of my invention to provide a method of reclaiming random ferrous metal sheet offal and other scrap without resorting to the remelting and subsequent processing now conventionally required to prepare said material for the hot strip mill.

It is a further and more specific object of my invention to provide a method of preparing and treating randomly sized and shaped carbon steel offal whereby it may be hot-rolled directly into reusable sheet or strip product on a mass production scale without a remelting operation.

In accordance with a preferred embodiment of my invention, these and other objects are accomplished by providing many pieces of randomly sized and shaped carbon steel sheet offal, generally less than about three inches in greatest dimension and preferably less than one and one-half to two inches in greatest, dimensions, by any suitable processing technique dependent upon the shape and and size of the offal initially available. Oil, paint (in the case of scrap from junk automobiles) and other debris are removed from the pieces, if necessary and desired, by degreasing and/or burning so that the surfaces of the scrap pieces are clean for further processing. An elongated cabon steel sheet of substantially the same chemical composition as the offal and of generally the same width as the flat-rolled product to be produced is provided. This sheet is disposed horizontally. Preferably, allowance is made in the original width of the sheet so that the edges thereof may be turned up, trough-like, on each side to carry and contain the pieces of offal on the otherwise flat surface. The clean offal is dropped onto the carrier sheet to a height no less than twenty times the thickness of the sheet, and the package comprising the carrier sheet and offal (which in a continuous operation may be substantially endless in length) is conducted into a suitable furnace containing a reducing atnosphere. The carrier sheet package is furnace heated to a suitable solid state welding temperature, generally about 800° to 2200° F. and preferably about 2000° F., whereupon the package of loose offal particles, still in the reducing atmosphere, is compacted and consolidated between suitable rollers into a sheet or strip having a density greater than 90% of carbon steel. If sufficient consolidation has been accomplished in the first roller stage, whereby a 90% + density is obtained, the newly formed sheet or strip may be removed from the reducing atmosphere and drawn through further rolling operations in tandem in accordance with conventional steel mill practice. The subsequent hot-rolling or hot-rolling and cold-reduction steps produce a sheet of predetermined thickness which is entirely suitable for reuse in forming operations.

I have found that, in accordance with my process, randomly sized and shaped ferrous metal offal or other scrap may be converted, without remelting and on a mass production scale, into a flat-rolled ferrous metal product which is in all respects equivalent to like products produced from molten steel or the like and is in fact indistinguishable therefrom.

Other objects and advantages of my method will become more apparent from a detailed description of the invention, in which reference will be had to the following figures of the drawings.

FIG. 1, as previously stated, is a line and block diagram of prior art conventional processing cycle of steel sheet;

Figure 1:
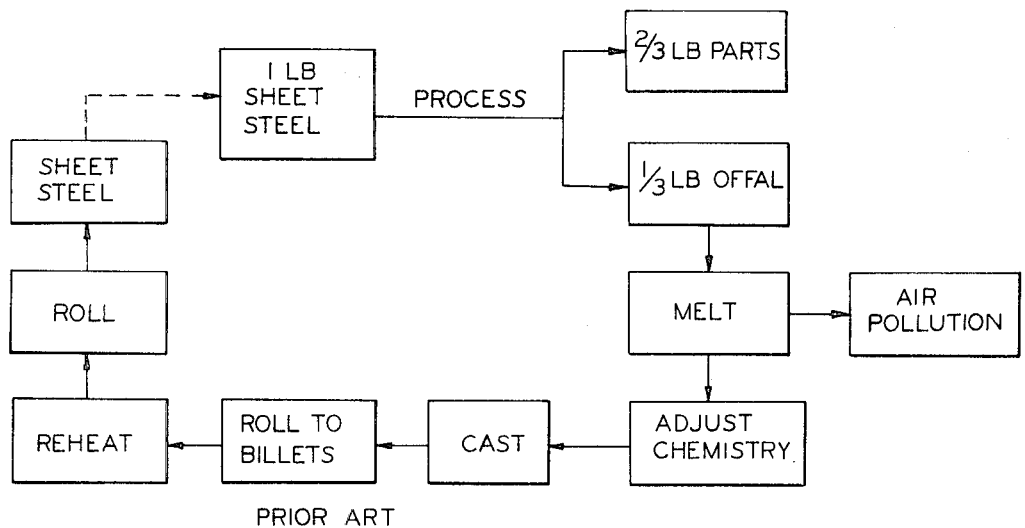
Figure 2:
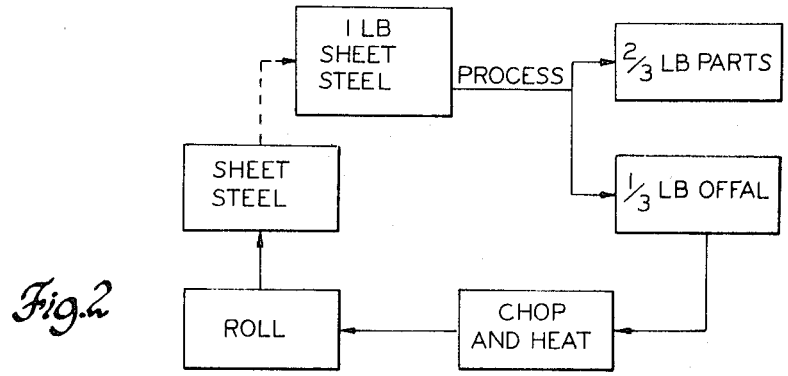
FIG. 2 is a line and block diagram of a processing cycle of steel sheet in accordance with my invention.

In the forming of many useful articles of commerce ferrous metal sheet, and particularly carbon steel sheet, generally up to about one-fourth inch in thickness, is conventionally subjected to drawing, cold forming, stamping or like operations. In this manner interior and exterior automotive parts, appliance components, farm implement components and many other useful articles are produced. A large amount of carbon steel scrap or offal is generated by these forming operations. Moreover, about 70% of the flat-rolled steel products produced in the United States are made from steel compositions comprising by weight, carbon 0.03% to 0.12%, manganese .20% to 0.60%, phosphorus 0.04% maximum, other elements as low as possible, and the balance substantially all iron. It is this carbon steel scrap that is particularly amenable to conversion to reusable flat-rolled products by my invention. As briefly outlined in the line and block diagram of FIG. 2, the steel scrap, frequently mounting up to one-third of the starting material, may be recovered by converting it into a suitable form and consolidating it hot between rollers into reusable sheet.

The preferred preparation treatment of ferrous metal sheet scrap for subsequent hot-rolling by my invention depends in large measure on its initial shape. This in turn is determined by the nature of the forming operations from which the scrap resulted or by the configuration of an article containing ferrous sheet metal which is to be scrapped or junked. If the random sized sheet scrap is initially reasonably flat, it is preferable to fully flatten it and chop it into small flat chips or platelets. Preferably the platelets have a maximum dimension of up to about two inches. Chips of this size can readily be cleaned and loaded on a carrier sheet for subsequent heating and consolidation. Flat chips, when economically obtainable, are preferred for rolling in accordance with my process because they can readily be arranged in a close packed alignment on a carrier sheet for efficient compaction into reusable flat-rolled stock. Flattening and chopping operations can be accomplished by conventional rolling and shearing equipment or by machines particularly designed to perform these operations on a continuous basis as part of the complete production operation in accordance with the process. I have found that flat chips having a maximum dimension in the range of about one-eighth inch to two inches, preferably about one inch, may be deposited on a carrier sheet of the same composition to provide a package for rolling having a stacked density of the order of 200 pounds per cubic foot, which is roughly 40% of the density of a solid mass of ferrous metal occupying the same volume. It is desirable that the carrier sheet-scrap package for rolling have a superficial density of about 35% to 50% of the density of the ferrous based material so that a higher yield of flat-rolled product is obtained from a given volume of starting material.

However, there is likely to be scrap sheet material which is twisted, folded or otherwise shaped in a manner that it is uneconomical to attempt to flatten this material for close packing on the carrier sheet. In these circumstances it is then suitable to chop the material to a suitable length so its maximum dimension is less than about three inches, or to pass the material through a hammer mill, or the like, that will produce fragments of partially spherical pieces having a maximum dimension in terms of diameter of less than about three inches and preferably of less than about one and one-half inch in diameter. The point is that the sheet scrap, no matter what its configuration, may be converted to randomly sized and shaped pieces having a major dimension of less than about three inches so that they can be packed or stacked onto a carrier sheet of the same composition in a reasonably dense arrangement. In some situations, such as when the scrap is hammer mill product or otherwise severely distorted scrap, it may be possible to obtain a carrier sheet and offal package which weighs only about 125 to 150 pounds per cubic foot, or, in other words, has a density of only about 25% to 30% of the density of the ferrous based material. Even in these situations suitable flat-rolled reconstituted stock may be obtained by the process of my invention, but the yield per cubic foot of starting package will be lower. However, it may still be more economical to process such unflattened scrap on a carrier sheet in accordance with my process in a relatively low density arrangement than to preprocess the scrap completely to flat chips.

If the starting scrap material is contaminated with lubricating oil or other organic material or debris it preferably is removed. This may be accomplished by conventional vapor degreasing or by burning. In the embodiment of one aspect of my invention depicted in the drawing starting with FIG. 3, bent and folded pieces of carbon steel scrap 10 are hammer milled into the form of fragmentized, partially spherical pieces 12 (like sheets of paper crumpled into small balls) and then passed through a suitable rotary kiln 14 wherein oil and other combustible or volatile materials are burned or vaporized therefrom. For purposes of illustration of one mode of practice of my invention, the treatment of hammer mill prepared scrap in the form of partially spherical pieces 12 is depicted. It is to be appreciated, however, that scrap, originating from sheet or strip metal, or virtually any size and shape may be dealt with in accordance with my process so long as it is reduced to particles which are relatively small, preferably less than about three inches in greatest dimension. The reduced particles or pieces of random small size and shape may be stacked in reasonably dense loading on a carrier sheet, although less than 50% of the density of the solid metal, even if they are highly bent and contorted.

Figure 4:
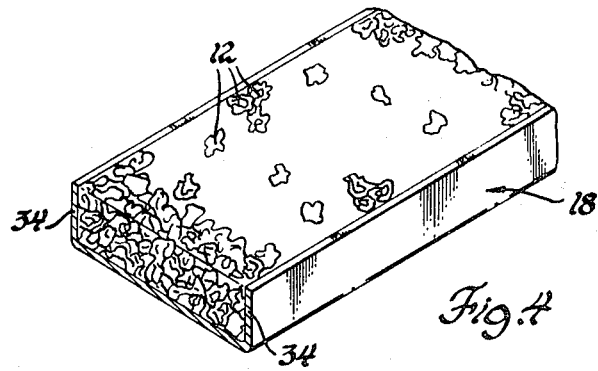
FIG. 4 is a sectional view in perspective taken along line 4—4 of FIG. 3 showing the arrangement of pieces of one type of steel scrap on a steel carrier sheet.
Figure 8:
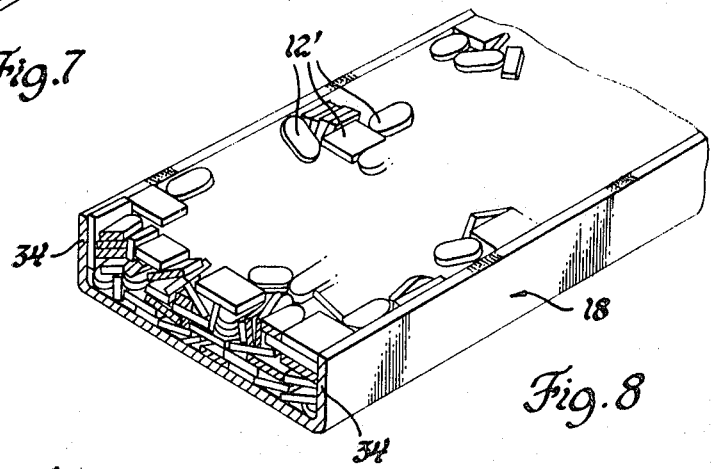
FIG. 8 is a view similar to FIG. 4 showing the loading of flat steel chips stacked on a steel carrier sheet.
Figure 9:
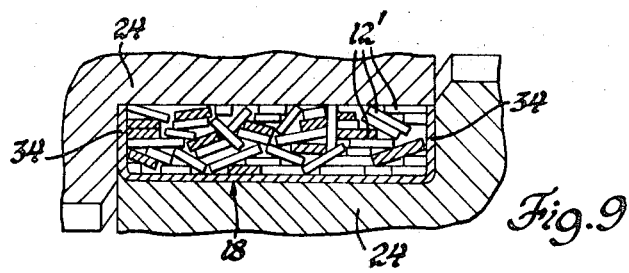
FIG. 9 is a view similar to FIG. 5 showing a package of flat steel chips entering the bite of a rolling mill.

The kiln cleaned pieces 12 are ready for compaction by hot-rolling into a high density reusable flat-rolled product. In accordance with my method I prefer to accumulate the partially spherical pieces 12 in a suitable vibratory feed hopper 16. Hopper 16 is positioned over a horizontally disposed carbon steel carrier sheet 18 of substantially the same composition as the scrap pieces 12. The two edges (34 in FIGS. 4 and 5) of the carrier sheet are turned up to form a pan or trough so that the scrap pieces 12 may be stacked therein to a suitable thickness, preferably in the range of three to ten inches, but at least to a height of no less than twenty times the thickness of the carrier sheet itself. The carrier sheet 18 should make up no more than about 5% by weight of the final flat-rolled product. A suitable vibrator 20 may be positioned beneath carrier sheet 18 to vibrate the carrier and scrap pieces to encourage the pieces 12 to pack and align themselves in a dense arrangeemnt. If the scrap pieces were flat, as illustrated in FIGS. 8 and 9, they would tend to stack and align themselves so that the major portion of the flat chips or platelets would lie parallel or flat with respect to the carrier sheet and so that there would be some overlapping with respect to each other. FIG. 4 better illustrates an example of the fragmented, partially spherical pieces 12 and carrier 18 package.

When SAE 1008 steel offal is being processed, a carrier sheet of SAE 1008 sheet is provided having sufficient thickness to provide transport through a heating furnace and the first rolling mill stand. If the SAE 1008 steel offal is stacked to a height of about five inches on the carrier sheet, I have found that 0.059 gauge SAE 1008 steel is suitable for use as a carrier. The thickness of the carrier sheet, of course, may vary depending upon the density of the packing and the height of the loading of the scrap pieces. In practice supply coils of carrier sheet material may be simply unwound and the edges turned up by suitable automatic equipment not shown so that a substantially continuous process may be employed.

When the scrap pieces have been deposited stacked in as dense an arrangeemnt as can be obtained by efficient handling techniques onto the carrier sheet 18, the sheet 18 and scrap pieces 12 are advanced into a furnace 22. Furnace 22 (see FIG. 3) may employ any suitable heating means, such as radiant heating, which is capable of raising the temperature of the carrier sheet and scrap pieces loaded thereon to about 1800° to 2200° F. for hot-rolling. In the case of SAE 1008 steel it is preferred that the materials be heated to about 2000° F. The furnace must contain a reducing atmosphere. An example of a suitable atmosphere is one which consists nominally of 40% by volume hydrogen, 20% by volume carbon monoxide and 40% by volume nitrogen. Another example of a suitable atmospheer is one which consists of 2% to 40% by volume hydrogen and the remainder nitrogen. Furnaces and atmospheres suitable for employment in accordance with my invention generally are not of unusual design with respect to their mode of operation and need not be described in further detail.

Before the hot carrier sheet 18 and scrap pieces 12 are removed from the protective nonoxidizing furnace atmosphere they are passed between suitable rollers 24 whereby they are compacted and consolidated to a strip having a density of greater than 90% of, and preferably about 100% of that of carbon steel.

Figure 3:
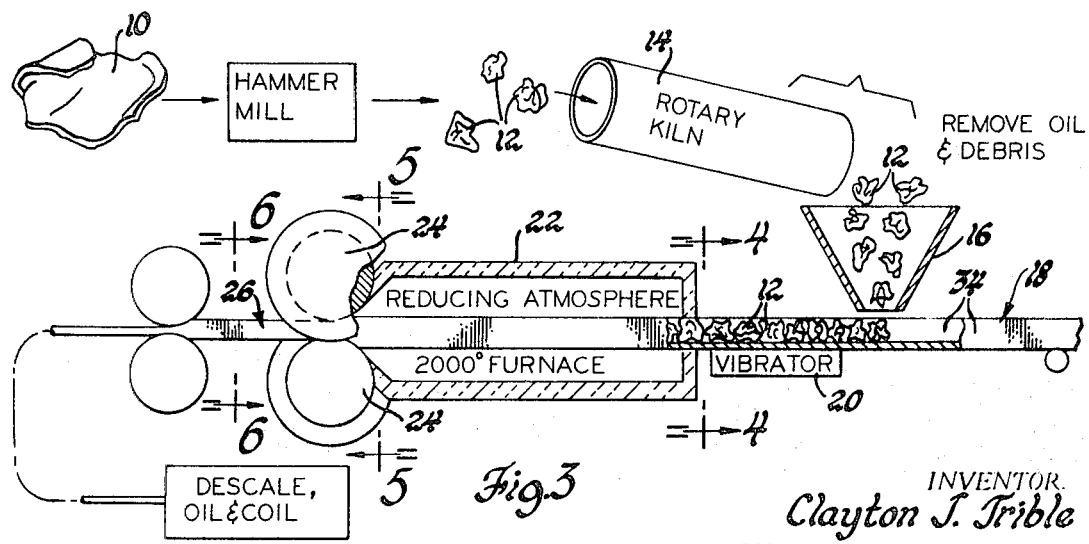
FIG. 3 is a schematic representation of the practice of my process depicting some of the equipment which is employed in a preferred embodiment thereof.
Figure 5:
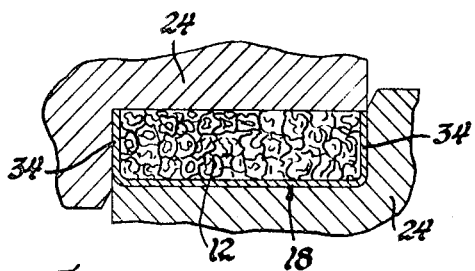
FIG. 5 is a sectional view along line 5—5 of FIG. 3 showing the carrier sheet and scrap as they are entering the bite of rollers suitable for employment in my method.

The rollers 24 must be capable of operating on metal at temperatures defined above and of subjecting the chips to pressures in the order of 10,000 to 30,000 p.s.i. whereby the consolidation is accomplished. The diameter and other structural features of the rollers are not particularly critical. A large number of roller designs have been developed in connection with the rolling of many different steel products and some such rollers may be adapted for use in accordance with my invention. While only two rollers in the first rolling mill stand are shown in FIGS. 3 and 5, other roller arrangements may be adapted. The rollers, of course, must be as wide as the strip to be formed and, as shown in the sectional view of FIG. 5, may be adapted to contain and confine the edges of the carrier sheet and scrap pieces so that a good edge is obtained and the width of the formed strip is maintained during the compaction step. The rollers 24, shown in section in FIG. 3, are of the known Z configuration. Alternatively, plain rollers could be employed and suitable mechanical edge guides employed to prevent lateral collapse or displacement of the carrier sheet and scrap load as it enters the bite of the rollers.

Figure 6:
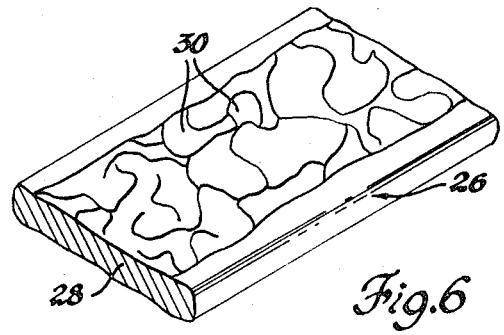
FIG. 6 is a sectional view in perspective taken along line 6—6 of FIG. 3 showing the compacted strip as it leaves the first roller stage.
Figure 7:
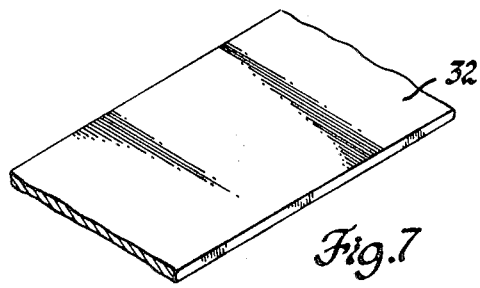
FIG. 7 is a perspective view of a steel sheet produced in accordance with my process.

The density of the stacked hammer mill pieces in and on the carrier sheet (illustrated in FIGS. 4 and 5) has been found typically to be about 25% to 30% of the density of solid steel. If the loose pieces are compacted to solid steel but with very little elongation lengthwise or widthwise, the thickness of the roller strip from the first stage would be something less than one-third that of the stacked pieces. However, loose chips are extremely difficult to compact to 100% density without some lengthwise elongation. In accordance with my invention as applied to SAE 1008 steel fragmented hammer mill particles, lengthwise elongations of 30% to 60% upon being passed through rollers 24 are typical and substantial reductions in thickness are obtained. For example, with an initial package of five to five and one-half inches in thickness entering the rollers it is not unusual to obtain a consolidated strip five-eighths inch in thickness leaving the first rolling mill stand. FIG. 6 shows the substantially void-free strip 26 which may be produced by the Z roller in one pass. The interior 28 of the strip 26 is a void-free structure. However, it is not unusual at this point in the processing to have some surface irregularities 30 because of insufficient working and deformation of the surface layer. At this stage the strip 26 is strong and ready for further working in accordance with a more or less conventional sheet steel making process as applied to slabs or strips of substantially the same thickness. These operations include such steps as hot-rolling through further stages to reduce the thickness and increase the length of the strip and at the same time improve the quality of the surface. When the strip has been reduced to approximately the desired thickness it is subjected to descaling or pickling operations and rolled into coils. Material which is to be subjected to cold reduction operations may then be selected and processed accordingly. Sheet 32 in FIG. 7 portrays a section of typical sheet metal produced in accordance with my invention.

When the available scrap is processable into relatively small, flat chips or platelets, the flat pieces can readily be arranged and aligned on a suitable carrier for efficient compaction into reusable sheet stock. In a preferred embodiment of the invention the flat pieces are processed in a manner similar to the described handling of the hammer mill product. The flat pieces are deposited on a carrier, and the carrier and flat pieces are vibrated thereby causing the flat pieces 12' (see FIGS. 8 and 9) to stack and align themselves so that the major portion of the pieces 12' lie parallel to or flat with respect to the carrier sheet 18 and that there is some overlapping with respect to each other. FIG. 8 illustrates an example of the flat pieces 12' and carrier 18 package as the package is about to enter furnace 22. FIG. 9 shows the package after it has been heated to a suitable solid state welding temperature and as it is about to enter the bite of rollers 24. Upon being passed between the rollers the flat pieces are compacted and welded to each other and to the carrier forming a flat-rolled sheet or strip having a density greater than 90% of, and preferably about 100% of that of the solid metal.

The apparent bulk density of the stacked and arranged flat chips in and on the carrier sheet has been found typically to be about 35% to 50% of the density of solid steel. As indicated above, scrap pieces that are not flat are not likely to stack on the carrier in as dense a loading. However, my process is operable to accomplish a consolidation of the stacked scrap pieces from an apparent density of about 25% to 50% of the solid metal to a density of over 90% and preferably about 100%, in the first rolling mill stage.

It is expected that the carrier sheet will form no more than about 5% by weight of the final flat-rolled product. Thus, it is apparent that many production-type operations about this percentage of the final product or equivalent thereof will have to be recycled to supply the requirements for the carrier sheet.

While my invention has been described in the terms of a preferred embodiment thereof it is apparent that other forms might readily be adapted and therefore the scope of my invention is to be considered limited only by the following claims.

What is claimed is:

1. A method of reconstituting ferrous metal scrap into reusable flat-rolled ferrous metal stock comprising
   processing said scrap into the form of many small pieces,
   depositing said pieces on a metal carrier, said pieces being stacked in a porous layer on said carrier to a height substantially several times in excess of the thickness thereof, said pieces having a stacked density not exceeding about one-half the density of the solid ferrous metal scrap,
   heating said pieces and carrier to a suitable ferrous metal solid state welding temperature,
   passing said heated pieces and carrier between a set of rollers to weld and compact said pieces and carrier into a flat-rolled ferrous metal stock having a density of at least 90% of the density of said solid ferrous metal scrap and
   subsequently rolling said flat-rolled stock through at least one additional roller stage to produce a reconstituted, fully densified, flat-rolled ferrous metal product.

2. A method of reconstituting randomly sized and shaped ferrous metal sheet scrap into reusable flat-rolled ferrous metal stock comprising
   providing said sheet scrap in the form of many small pieces,
   depositing said pieces of scrap on a ferrous metal carrier sheet of substantially the same composition as said scrap, said pieces of scrap being stacked in a porous layer on said carrier sheet to a height greater than about twenty times the thickness thereof, said pieces having stacked density not exceeding about one-half the density of the said ferrous metal scrap,
   heating said scrap and said carrier in a reducing atmosphere to a suitable ferrous metal solid state welding temperature,
   passing the heated pieces and carrier sheet between a set of rollers before removal from said atmosphere to weld said scrap pieces and carrier sheet into a flat-rolled ferrous metal stock having a density of at least 90% of the density of said ferrous metal,
   and subsequently rolling the newly formed strip through at least one additional roller stage to produce a reconstituted, fully densified, flat-rolled ferrous metal stock.

3. A method of reconstituting random ferrous metal sheet scrap into reusable flat-rolled ferrous metal stock comprising
   providing said sheet scrap in the form of many small, randomly sized and shaped pieces of no more than about three inches in greatest dimension,
   depositing said pieces of scrap on a generally horizontally disposed ferrous metal carrier sheet of substantially the same composition as said scrap, said scrap being stacked on said carrier sheet to a height no greater than about ten inches and no less than twenty times the thickness of said carrier sheet,
   heating said scrap and said carrier sheet in a reducing atmosphere to a temperature in the range of about 1800° to 2200° F.,
   passing the heated pieces and carrier sheet between a set of rollers before removal from said atmosphere to weld said scrap pieces into a ferrous metal strip having a density of at least 90% of the density of said ferrous metal,
   and subsequently rolling the newly formed scrap through additional roller stages to produce a reconstituted, fully densified, flat-rolled ferrous metal stock.

4. A method of reconstituting random carbon steel sheet scrap into reusable flat-rolled steel stock comprising
   providing said sheet scrap in the form of many small, randomly sized and shaped pieces of no more than about three inches in greatest dimension,
   depositing said pieces of scrap on a generally horizontally disposed carbon steel carrier sheet of substantially the same composition as said scrap, said scrap being stacked on said carrier sheet to a height no less than twenty times the thickness thereof,
   heating said scrap and said carrier sheet in a reducing atmosphere to a temperature in the range of about 1800° to 2200° F.,
   passing the heated pieces and carrier sheet between a set of rollers before removal from said atmosphere to weld said scrap pieces and said carrier sheet into a carbon steel strip having a density of at least 90% of the density of said carbon steel,
   and subsequently rolling the newly formed strip through at least one adidtional roller stage to produce a reconstituted, fully densified, flat-rolled carbon steel stock.

5. A method of reconstituting random carbon steel sheet scrap into reusable flat-rolled carbon steel stock comprising
   providing said sheet scrap in the form of many small, generally flat chips,
   depositing said scrap chips on a generally horizontally disposed carbon steel carrier sheet of substantially the same composition as said scrap, said chips being stacked in a porous layer to a height several times in excess of the thickness thereof, said stacked chips having a stacked density not exceeding about one-half the density of said carbon steel scrap,
   heating said chips and said carrier to a temperature in the range of about 1800° to 2200° F.,
   passing the heated chips and carrier sheet between a set of rollers to weld said scrap chips into a carbon steel having a density of at least 90% of the density of said carbon steel,
   and subsequently rolling the newly formed strip through a plurality of roller stages in tandem to produce a reconstituted, fully densified, flat-rolled carbon steel stock.

6. A method of reconstituting random carbon steel sheet scrap into reusable flat-rolled steel stock comprising
   hammer milling said sheet scrap to produce many small, fragmented, randomly sized and shaped, at least partially spherical pieces no greater than about three inches in greatest dimension,
   depositing said pieces on a generally horizontally disposed carbon steel carrier sheet of substantially the same composition as said scrap, said pieces of scrap being stacked on said carrier sheet to a height no less than twenty times the thickness thereof,
   heating said scrap pieces and said carrier in a reducing atmosphere to a temperature in the range of about 1800° to 2200° F., passing the heated pieces and carrier sheet between a set of rollers before romoval from said atmosphere to weld said pieces into a carbon steel strip having a density of at least 90% of the density of said carbon steel, and subsequently rolling the newly formed strip through at least one additional roller stage to produce a reconstituted, fully densified, flat-rolled carbon steel stock.

7. A method of reconstituting ferrous metal scrap into reusable flat-rolled ferrous metal stock comprising providing said scrap in the form of many small, flat chips, depositing said chips on a horizontally disposed ferrous metal carrier sheet of substantially the same composition as said chips, said chips being stacked and arranged such that the major portion of their number are substantially in overlapping relationship and generally parallel with respect to said sheet, heating said chips and said carrier in a reducing atmosphere to a temperature in the range of about 1800° to 2200° F., passing the heated chips and carrier sheet between a set of rollers before removal from said atmosphere to weld said chips into a ferrous metal strip having a density of at least 90% of the density of said ferrous metal, and subsequently rolling the newly formed strip through at least one additional roller stage to produce a reconstituted, flat-rolled ferrous metal product.

8. A method of reconstituting carbon steel scrap into reusable flat-rolled carbon steel stock comprising providing said scrap in the form of many small, flat pieces, depositing said pieces on a horizontally disposed carbon steel carrier sheet of substantially the same composition as said pieces, said pieces being stacked on said carrier sheet in a porous layer to a height greater than about twenty times the thicknes of said carrier sheet and to a density of less than about one-half the density of said carbon steel, said pieces being stacked and arranged such that the major portion of their number are substantially in overlapping relationship and generally parallel with respect to said sheet, heating said scrap pieces and said carrier in a reducing atmosphere to a temperature in the range of about 1800° to 2200° F., passing said heated scrap pieces and carrier sheet between a set of rollers before removal from said atmosphere to weld said pieces to each other and to said carrier into a carbon steel strip having a density of at least 90% of the density of carbon steel, and subsequently rolling the newly formed strip through a plurality of roller stages to produce a reconstituted, fully densified, flat-rolled carbon steel stock.

9. In the art of forming flat-rolled ferrous metal stock into useful articles of commerce and concomitantly producing random offal, the improvement comprising providing said offal in the form of many flat chips of about two inches or less in greatest dimension, depositing said chips on a horizontally disposed ferrous metal carrier sheet of substantially the same composition as said chips, said chips being arranged such that the major portion of their number are substantially in overlapping relationship and generally parallel with respect to said sheet, said carrier strip forming no more than about 5% of the total weight, heating said chips and said carrier in a reducing atmosphere to a temperature in the range of about 1800° to 2200° F., passing the heated chips and carrier sheet between a set of rollers before removal from said atmosphere to weld said chips into a ferrous metal strip having a density of at least 90% of the density of said ferrous metal and subsequently rolling the newly formed strip through a plurality of roller stages to produce a reconstituted flat-rolled ferrous metal product of predetermined width and thickness.

10. In the art of forming carbon steel flat-rolled products into useful articles of commerce and concomitantly producing random offal, the improvement comprising collecting and providing the random sized scrap in the form of many small flat sections of about one-eighth to two inches in greatest dimension, depositing said scrap sections on a long horizontally disposed carbon steel carrier sheet of substantially the composition of said scrap, the width of said carrier sheet being substantially the width of a reconstituted sheet to be produced, said scrap being arranged so that the major portion of said small sections are in overlapping relationship with each other and generally parallel with respect to said sheet, said carrier strip forming no more than about 5% of the total weight, passing said carrier sheet and its contents through a furnace containing a reducing atmosphere and heating said cut scrap and carrier to a temperature in the range of about 1800° to 2200° F., passing the hot carrier and scrap between a set of rollers before the scrap is removed from said reducing atmosphere whereby the many individual sections of scrap are plastically worked and thereby aligned and welded into a dense flat strip of up to two inches in thickness, the density of said strip being at least about 95% of the density of said carbon steel, and subsequently passing said strip through a plurality of roller stages to produce a flat-rolled steel product of predetermined width and thickness, said product having been obtained from said offal without remelting.

11. In the art of forming flat-rolled carbon steel products into useful articles of commerce and concomitantly producing random offal, the improvement comprising collecting, flattening and cutting random sized sheet scrap into many small flat sections of about one-eighth to two inches in greatest dimension, continuously depositing said scrap sections to a uniform depth on a long horizontally disposed carbon steel carrier sheet of substantially the same composition of said scrap and vibrating said sheet and said scrap whereby said scrap is arranged so that the major portion of said small sections are in overlapping relationship with respect to each other and generally parallel with repsect to said sheet, said carrier strip forming no more than about 5% of the total weight, the width of said carrier sheet being substantially the width of the reconstituted flat-rolled product to be produced, continuously passing said carrier sheet and its contents through a furnace containing a reducing atmosphere and heating said cut scrap and carrier to a temperature in the range of about 1800° to 2200° F., passing the hot carrier and scrap between a set of rollers before removal from said reducing atmosphere whereby the many individual sections of said scrap are plastically worked and thereby arranged and welded into a dense flat strip of up to about two inches in thickness, the density of said strip being at least about 95% of the normal density of carbon steel, and subsequently passing said newly formed strip through a plurality of roller stages to produce a reconstituted flat-rolled steel product of predetermined width and thickness, said product thus having been obtained without remelting said scrap.

12. In the art of forming flat-rolled ferrous metal stock into useful articles of commerce and concomitantly producing random offal, the improvement comprising providing said offal in the form of many small chips, depositing said chips on a horizontally disposed ferrou metal carrier sheet of substantially the same composition as said chips, said chips being stacked on said carrier sheet to a density of no less than one-third of the density of said ferrous metal, said carrier sheet forming no more than about 5% of the total weight, heating said chips and said carrier in a reducing atmosphere to a temperature in the range of about 1800° to 2200° F., passing the heated hips and carrier sheet between a set of rollers before removal from said atmosphere to weld said chips into a ferrous metal strip having a density of at least 90% of the density of said ferrous metal and subsequently rolling the newly formed strip through a plurality of roller stages to produce a reconstituted fully densified flat-rolled ferrous metal stock.

13. In the art of forming flat-rolled carbon steel stock into useful articles of commerce and concomitantly producing random offal, the improvement comprising providing said offal in the form of many small chips, depositing said chips on a horizontally disposed carbon steel carrier sheet of substantially the same composition as said chips, said chips being stacked on said carrier sheet to a density of no less than one-third of the density of said carbon steel, said carrier sheet forming no more than about 5% of the total weight, heating said chips and said carrier in a reducing atmosphere to a temperature in the range of about 1800° to 2200° F., passing the heated chips and carrier sheet between a set of rollers before removal from said atmosphere to weld said chips into a carbon steel strip having a density of at least 90% of the density of said carbon steel and subsequently rolling the newly formed strip through a plurality of roller stages to produce a reconstituted fully densified flat-rolled carbon steel stock.

14. In the art of forming flat-rolled carbon steel products into useful articles of commerce and concomitantly producing random offal, the improvement comprising collecting, flattening and cutting random sized carbon steel sheet scrap into many small flat thin sections, continuously depositing said scrap sections to a uniform depth on a long, horizontally disposed carbon steel carrier sheet of substantially the same composition as said scrap and vibrating said sheet whereby said scrap is arranged so that the major portion of said small sections are in overlapping relationship with respect to each other and generally parallel with respect to said sheet, said carrier strip forming no more than about 5% of the total weight, continuously passing said carrier sheet and its contents through a furnace containing a reducing atmosphere and heating said cut scrap and carrier to a temperature in the range of about 1800° to 2200° F., passing the hot carrier and scrap between a set of rollers before removal from said reducing atmosphere whereby the many individual sections of said scrap are plastically worked and thereby arranged and welded into a dense flat strip, the density of said strip being at least about 95% of the normal density of carbon steel, and subsequently passing said newly formed strip through a plurality of roller stages to produce a reconstituted fully densified flat-rolled sheet stock.

References Cited

UNITED STATES PATENTS

| | | | |
|---|---|---|---|
| 99,574 | 2/1870 | Jones | 29—420 X |
| 209,470 | 10/1878 | Edwards | 29—403 |
| 2,211,984 | 8/1940 | Paterson | 29—403 |
| 2,383,766 | 8/1945 | Brassert | 29—420 X |

FOREIGN PATENTS

| | | | |
|---|---|---|---|
| 7,081 | 4/1906 | Great Britain | 29—403 |

JOHN F. CAMPBELL, Primary Examiner

D. C. REILEY, Assistant Examiner

U.S. Cl. X.R.

18—Dig. 46; 29—420, Dig. 32

PO-1050
(5/69)

UNITED STATES PATENT OFFICE
CERTIFICATE OF CORRECTION

Patent No. 3,626,577                    Dated December 14, 1971

Inventor(s)                Clayton J. Trible

It is certified that error appears in the above-identified patent and that said Letters Patent are hereby corrected as shown below:

Column 2, line 22, "accomulating" should be -- accumulating --; line 28, "uncom-" should be -- uncon- --; line 52, after "greatest" delete the comma ","; line 59, "cabon" should be -- carbon --. Column 3, line 71, "teatment" should be -- treatment --. Column 5, line 25, "arrangeemnt" should be -- arrangement --; line 60, "atmospheer" should be -- atmosphere --. Column 7, line 48, "ferorus" should be -- ferrous --; line 56, after "having" insert -- a --. Column 8, line 57, after "steel" insert -- strip --. Column 9, line 4, "romoval" should be -- removal --; line 42, "thicknes" should be -- thickness --. Column 10, line 26, before "two" insert -- about --; line 45, "repsect" should be -- respect --; line 68, "ferrou" should be -- ferrous --.

Signed and sealed this 23rd day of May 1972.

(SEAL)
Attest:

EDWARD M. FLETCHER, JR.      ROBERT GOTTSCHALK
Attesting Officer         Commissioner of Patents